(12) United States Patent
Marchand et al.

(10) Patent No.: US 6,786,166 B1
(45) Date of Patent: Sep. 7, 2004

(54) LIQUEFIED GAS STORAGE BARGE WITH CONCRETE FLOATING STRUCTURE

(75) Inventors: Denis Marchand, Versailles (FR); Catherine Jouanneaux, Dampierre en Yvelines (FR); Christophe Prat, Paris (FR)

(73) Assignee: Bouygues Offshore, Montigny le Bretonneux (FR)

( * ) Notice: Subject to any disclaimer, the term of this patent is extended or adjusted under 35 U.S.C. 154(b) by 106 days.

(21) Appl. No.: 10/111,255

(22) PCT Filed: Oct. 26, 2000

(86) PCT No.: PCT/FR00/02981

§ 371 (c)(1),
(2), (4) Date: Apr. 23, 2002

(87) PCT Pub. No.: WO01/30648

PCT Pub. Date: May 3, 2001

(30) Foreign Application Priority Data

Oct. 27, 1999 (FR) .............................................. 99 13689

(51) Int. Cl.$^7$ ................................................. B63B 25/08
(52) U.S. Cl. ..................................................... 114/74 R
(58) Field of Search ........................... 114/74 R, 74 A, 114/65 R, 65 A

(56) References Cited

U.S. PATENT DOCUMENTS

| | | | |
|---|---|---|---|
| 3,457,890 A | 7/1969 | Rivas et al. | 114/74 |
| 3,828,708 A | 8/1974 | Gerwick, Jr. et al. | 114/65 |
| 3,926,134 A | * 12/1975 | Closner et al. | 114/74 R |
| 4,275,679 A | 6/1981 | Finsterwalder | 114/264 |

FOREIGN PATENT DOCUMENTS

| | | | |
|---|---|---|---|
| DE | 23 61 224 | 12/1973 | B63B/5/14 |
| DE | 26 44 856 | 4/1978 | B63B/35/02 |

OTHER PUBLICATIONS

"The Dytan Design of a Concrete Constructed LNG Carrier", Shipping World and Shipbuilder, Dec., 1976 pp. 1021–1022.

Arthur R. Anderseon, Design and Construction of a 375,000 bbl Prestressed Concrete Floating LPG Storage Facility for the Java Sea, Offshore Technology Conference, 1976 pp. 673–688.

* cited by examiner

Primary Examiner—Ed Swinehart
(74) Attorney, Agent, or Firm—Cohen, Pontani, Lieberman & Pavane

(57) ABSTRACT

The present invention relates to a liquefied gas storage barge in the form of a concrete floating structure. The barge of the invention is essentially constituted by a floating structure (1) of reinforced and prestressed concrete containing tanks (2) for liquefied gas. Said tanks (2) are cylindrical tanks each having a cross-section perpendicular to its longitudinal axes that comprises a preferably circular curved portion (3) corresponding to the bottom of said tank, said portion being preferably a bottom half-circumference resting directly on the concrete bottom of the barge, which barge bottom is in the form of adjacent part-cylindrical troughs (3), each part-cylindrical trough having the same preferably circular, partially curved section in register with the bottom of each tank.

20 Claims, 2 Drawing Sheets

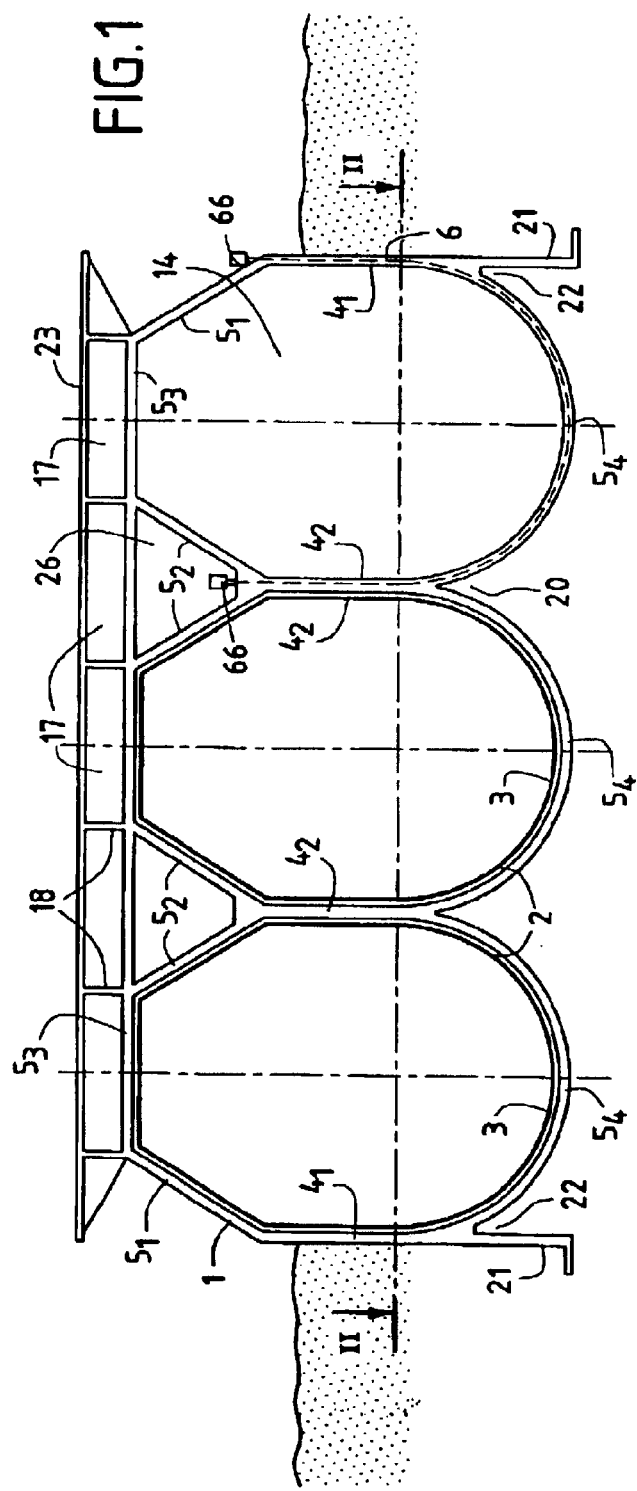
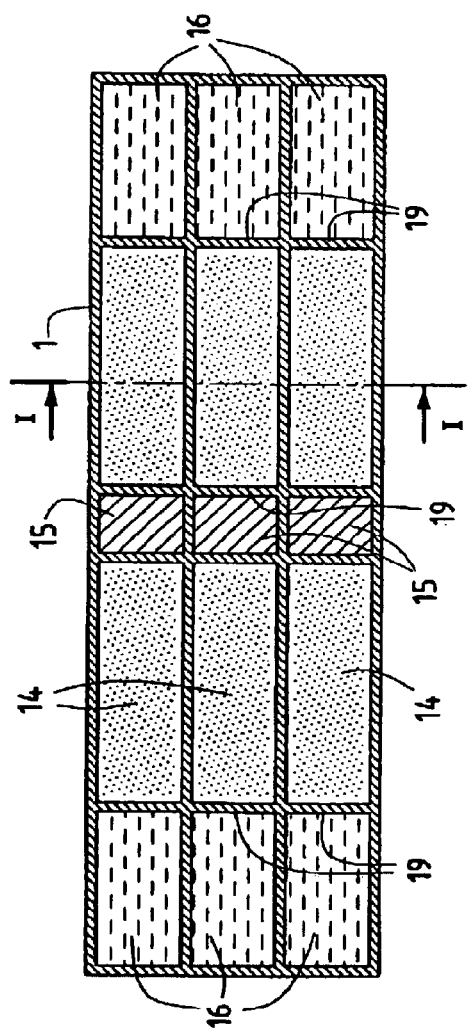

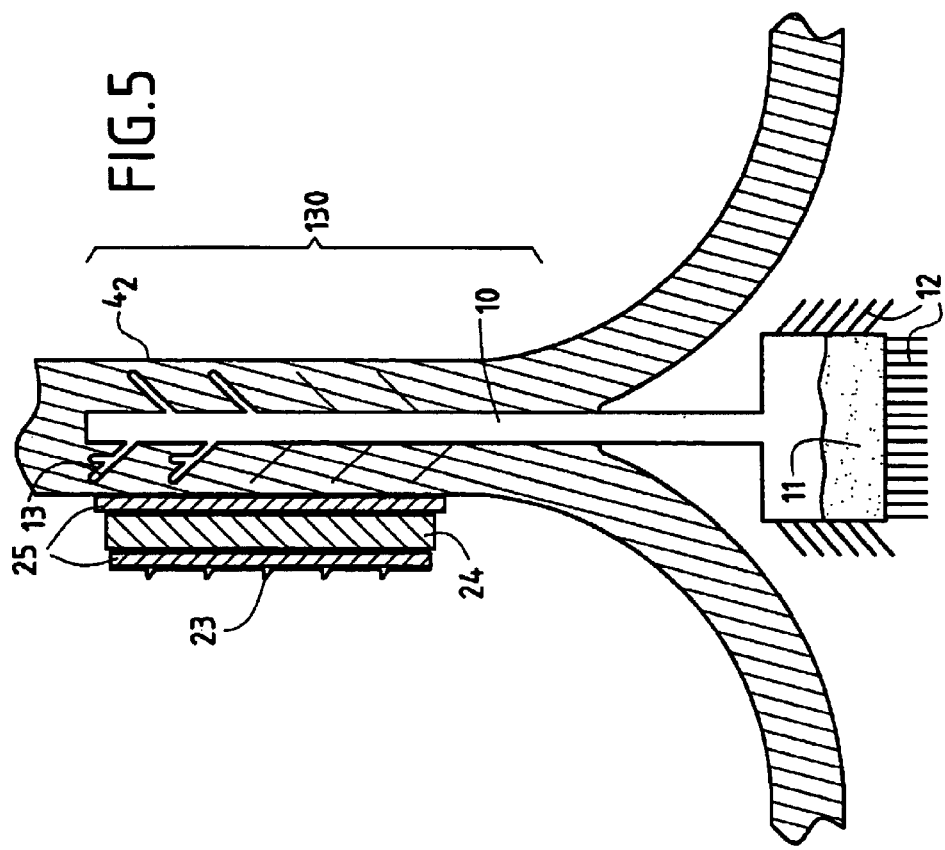
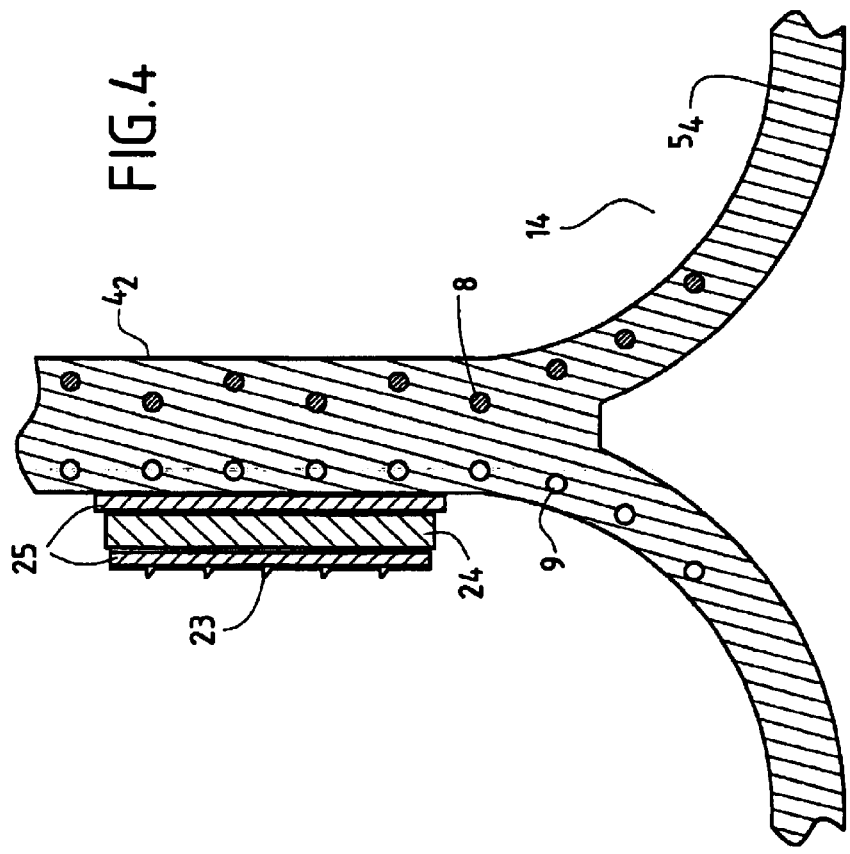
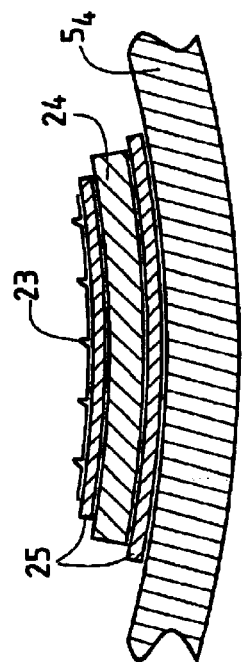

LIQUEFIED GAS STORAGE BARGE WITH CONCRETE FLOATING STRUCTURE

CROSS-REFERENCE TO RELATED APPLICATIONS

This is the National Stage of International Application No. PCT/FR00/02981, filed Oct. 26, 2000. Priority is claimed under 35 U.S.C. §119(a) and §365(b) from French Patent Application No. 99/13689, filed Oct. 27, 1999, from which priority was properly claimed in the aforementioned international stage application.

BACKGROUND OF THE INVENTION (1) Field of the Invention

The present invention relates generally to storing liquids in a concrete structure that can be moved while floating, and more specifically, to a barge for storing liquefied gas at sea.

(2) Description of the Related Art

Liquefied gases, such as methane, are stored either in freestanding tanks that are cylindrical, spherical, or prismatic, being made out of sheets of special steel or of thick aluminum, or else in tanks constituted by a thin membrane that provides leakproof confinement associated with a thermal insulation system constituted by blocks of foam, with the insulation system resting continuously on a support structure.

In the second configuration, the membrane is thus dimensioned solely to provide leakproof confinement of the liquid, and the mechanical strength of the assembly is provided by the external support structure which is not subjected to cryogenic cold.

French patent No. 2 271 497 discloses in particular such confinement and insulation systems suitable for liquefied natural gas (LNG) tankers and for storage on land, as developed amongst others by Société Gaz Transport & Technigaz (Trappes, France).

Tankers fitted to receive cryogenic storage tanks are normally made of steel by specialist ship yards. For liquid methane, given that the specific gravity of the substance is low (d≈0.47), the configuration of such tankers is most unusual, and because of the high cost of making thermally insulated tanks, LNG tankers are extremely expensive. They also require many precautions to be taken in operation since in the event of liquefied gas leaking onto structural elements of the steel hull of the tanker, the steel becomes brittle and no longer withstands the stresses from the surroundings, leading to the vessel being lost.

Floating structures that are similar but made of concrete have been envisaged because concrete behaves well when put into contact with liquefied gas at very low temperature, however such structures have been designed for sailing purposes and are much bulkier and more massive than vessels made of steel, so the resulting vessels are not economically competitive with equivalent vessels made of steel. Furthermore, their draft requires them to be built in dry docks that are deep, so as to make it possible for them to be moved into deeper water after the dry dock has been flooded.

DE 2 644 856 and FR 2 366 984 disclose a concrete vessel transporting tanks located in concrete compartments. In order to minimize the wetted surface area of the vessel, it has a flat bottom on which the bottom walls of the compartments rest. The side walls of the compartments are supported by cradle type support structures.

A concrete barge is also known that was built for the Ardjuna field (Indonesia) to store liquefied petroleum gas. Gas is stored therein at a temperature of −45° C. in freestanding cylindrical tanks that are thermally insulated, of circular section, and made of steel of medium thickness. The gas comprises butane and propane only. The tanks are stored on two levels: one series of six tanks is stored on deck and a second series of six tanks is stored inside the hull. Each of the tanks inside the hull rests on two cradles that form part of the concrete structure of the hull of the barge. The function of the cradles is to provide supports that come close to an isostatic system, thus minimizing the stresses generated by differential deformation between the tank and the structure of the barge and enabling the load corresponding to the weight of the tank plus its content, i.e. about 3000 (metric) tonnes, to be transferred under good conditions to the hull of the barge, which hull is subjected to buoyancy thrust over its entire wetted surface.

In that configuration, the load as distributed along the tank is concentrated via the cradles and then transferred through the cradles to the hull of the barge, thus giving rise to large concentrated forces, and then finally the load is distributed over the entire active zone of the hull that is subjected to buoyancy thrust. The barge measures about 140 meters (m) in length, 40 m in width, and 16 m in depth, and it is capable of storing about 60,000 cubic meters ($m^3$) of gas distributed between twelve identical lagged tanks.

In the storage zone for the lagged tanks, the concrete walls corresponding to the bottom, to the sides, and to the bulkheads are thus provided with reinforcing structures including thick beams associated with concrete shells or webs that must be over-dimensioned, at least in the transition zone, so that force distribution to the remainder of the structure of the hull can take place in satisfactory manner.

Concrete barges have not yet been proposed for storing quantities of gas in excess of 60,000 $m^3$, nor for storing liquefied gas at temperatures lower than −50° C., i.e. gas other than liquefied butane or propane, and in particular for liquid methane.

With the techniques commonly used for making barges of concrete structure, giant barge building cannot be extrapolated from the technology used for the Ardjuna barge since that would require either the number of conventional tanks to be multiplied or else tanks to be made that are small in number but gigantic in size, based on free-standing technology, but in that case there would be very great difficulties of implementation, or even technical impossibilities, because of the considerable loads to be transferred via the cradles (isostatic support).

Such giant tanks, for the cryogenic temperatures of liquefied methane (−165° C.) present significant shortening of the inside wall of the tank when it is cooled down, thus creating differential displacements at the supports between the tank and the structure of the barge, since the structure remains at ambient temperature. The supports become very difficult to design since they must be capable of accommodating these movements without giving rise to significant levels of stress which could create fatigue phenomena in said supports or in the tank, thus making such a barge dangerous to operate. These shrinkage phenomena exist with small tanks storing propane cooled to −50° C., but they can be overcome using supports of appropriate design. Extrapolating such principles to giant tanks working at −165° C. or at even lower temperatures would lead to support systems that are extremely complex, requiring major reinforcement of the concrete hull and thus requiring very large quantities of prestressed concrete to be used.

Furthermore, in spite of the good mechanical behavior of concrete, particularly when in contact with liquefied gas, the risk of micro-cracking appearing in zones of maximum stress (support cradles) can lead to water infiltrating through the solid concrete structure, running the risk of corroding the metal reinforcement inside the concrete and of degrading the performance of the insulation system, and this has dissuaded the person skilled in the art from using such concrete barges for storing liquefied methane at sea.

Such barges are subjected to large mechanical stresses from environmental conditions acting on the hull (swell, wind, currents), and also to forces that are large and very localized as created by the anchor system, which is generally situated at the four corners of the barge.

Furthermore, unlike vessels of the LNG tanker type which are generally not authorized to sail when half-loaded, and must often be either practically empty (less than 10%) or practically full (more than 85%), a floating storage facility can be filled to a level that lies anywhere in the range 0% to 100%, and it must provide very high levels of security regardless of the level to which it is filled.

U.S. Pat. No. 4,275,679 discloses concrete barges for storing liquefied gas, having concrete tanks in the form of hemispherical caps or of three-fourths spherical caps, possibly surmounted by circular cylinders extending vertically. Tanks of that shape having curvature in two directions simultaneously are difficult to make and they also require associated metal-work structures that are larger and difficult to make since the tanks do not have common side walls enabling the tanks to bear against one another and provide mutual support when placed side by side. In addition, such spherical shapes imply that a large quantity of concrete needs to be used.

SUMMARY OF THE INVENTION

The object of the present invention is to provide a barge for storing liquefied gas at sea, in particular methane, the gas being maintained at cryogenic temperatures, and in particular temperatures below $-100°$ C.

Another object of the present invention is to provide barges capable of storing large quantities, in particular more than 100,000 $m^3$, and preferably more than 200,000 $m^3$ of liquefied gas.

Another object of the present invention is to provide a barge capable of carrying, in particular on a top deck, a gas treatment unit, said gas being:

either received in the form of gas coming from an oil or gas well, in which case it is treated, then liquefied in specialized units, prior to being stored in the internal tanks of the barge;

or else it is received in liquid form from a tanker, in which case it is transferred on board and stored in the internal tanks of the barge, prior to being either delivered in liquefied form using other tankers or being heated in specialized units and delivered in gaseous form in underwater pipes for use at a location remote from the storage barge; or else being used on site to produce heat, electricity, or mechanical power. The energy produced using the gas can either be used on board or else exported to a remote location via underwater pipes or electric cables.

The top deck of the barge of the invention must have surface area and strength that are sufficient to receive all of the liquefaction or regasification installations, and also the equipment for producing electricity, and the total weight thereof can reach or exceed 35,000 tonnes to 50,000 tonnes.

Another object of the present invention is to provide a barge capable of being built either in dry dock in a ship yard, or else in a dry dock dug specially for the occasion, under conditions of cost and time that are economically competitive with vessels made of steel.

Insofar as the use of steel for building floating supports for storing liquefied natural gas at temperatures below $-100°$ C. and having gas treatment equipment installed on the deck thereof increases the level of risk associated with the structure becoming brittle in the event of liquefied gas escaping due to an accident in a liquefaction unit or a gas treatment unit, a problem behind the present invention is also to provide a concrete structure which presents sufficient mechanical strength in the event of such incidents, and consequently provides better safety in operation, and which can be built under better conditions concerning technical implementation and cost, in particular by minimizing the quantity of concrete used.

For this purpose, the present invention provides a barge for storing liquefied gas at sea, the barge being constituted essentially by a floating structure of reinforced and prestressed concrete containing tanks for liquefied gas.

According to the invention, said tanks are cylindrical tanks of cross-section perpendicular to their main longitudinal axes that includes a preferably circular curved portion corresponding to the bottom thereof, said portion being preferably a bottom half-circumference resting directly on the concrete bottom of the barge, with the bottom of the barge being in the form of a plurality of adjacent part-cylindrical troughs, each part-cylindrical trough having the same preferably circular partially curved section facing the bottom of each tank.

Said tank bottoms thus follow the outline of the surface and thus match continuously the shape of said barge bottom, said tank bottoms and said barge bottom being in the form of adjacent upside-down vaults.

Under the effects of currents, swell, and wind, the movements imparted to the barge give rise to dynamic variations of stress that are large, and both positive and negative in succession. In their bottom portions, the storage tanks and the barge of the invention are of a shape in the form of upside-down vaults, and in particular in the form of adjacent circular sectors, that makes it possible to use the hydrostatic pressure of the surrounding water to ensure that the cross-section of the structure is stressed essentially in pure compression, regardless of the level to which the tanks are filled, and this leads to considerable savings in materials concerning the concrete, the reinforcing structures, and the prestress means. The storage barge of the invention thus makes it possible to minimize the forces transmitted by the gas tanks to the concrete structure of the barge hull, and to avoid the load concentrations that result from using localized structural reinforcement, which would require very large quantities of concrete to be used. Stress distribution is optimal and makes it possible, throughout the working lifetime of the installation, for the assembly comprising the concrete structure and the tank to withstand firstly the pressure generated by the fluid, secondly the dynamic effects generated by the movement of the floating support under the effect of environmental conditions, and finally the various thermal stresses that are generated regardless of the level to which the cryogenic tanks are filled. Load is transferred from the liquid gas cargo to the concrete structure of the barge hull in uniform manner and the transverse stresses that arise in the concrete web are essential compression forces, which presents a considerable advantage concerning the risk of cracking and micro-cracking that exist for any concrete structure, and this avoids the risk of water migrating through the concrete of the structure and of the damage associated therewith, in terms of said reinforcement being corroded and possibly also in the insulation system if the tank is a thin membrane tank.

In a preferred embodiment, said tank is a tank of the type having a thin membrane covered on the outside in a thermally insulating complex, said complex resting directly against the concrete bottom of the barge, the concrete wall of said barge bottom being of substantially constant thickness and without any additional reinforcing structure over the entire tank-supporting zone.

The liquefied gas is thus contained in a cylindrical tank constituted by a membrane resting on an insulating complex, said insulating complex resting directly against the outside wall or the intermediate walls of the concrete structure of the barge. The concrete structure of the barge is constituted by a concrete web of substantially constant thickness in the side walls and the bottom and in register with the entire surface of the tank in question.

The use of a thin membrane tank contributes to improving load transfers and to reducing mechanical stresses in the tank since this type of tank presents stiffness that is negligible compared with the stiffness of the concrete structure of the barge, and as a result said membrane possesses very great capacity for deformation thus enabling it to follow any deformation of the concrete hull without any significant increase in stress, and regardless of whether the deformation is longitudinal bending, transverse bending, or twisting.

Associating a high performance concrete structure system, i.e. giving rise to a concrete structure hull whose ratio of buoyancy over own weight is high, with an ultralightweight confinement and insulation system also providing very high performance, presents the advantage while the barge is being built of requiring a dry dock that is shallower, thereby enabling construction to continue in the dry dock up to a stage that is much more advanced than has been possible in the prior art.

A larger quantity of heavy equipment can thus be installed "dry", e.g. the assemblies and subassemblies required on the top deck for enabling future operation of the installations. Greater freedom is thus afforded in planning construction, and the structure can be launched at a later date, thus reducing the number of finishing operations that need to be done afloat, where such operations are generally more expensive than if done before launch. This is particularly advantageous when the dry dock is dug specially for constructing the barge, since it is then possible to dig to a shallow depth only, thus minimizing digging costs, and in addition use thereof is generally not limited by any imperative to release the dry dock in order to build the following vessel, as is usually the case with a dry dock in a ship yard.

In an embodiment, the barge has at least two and preferably at least three tanks disposed longitudinally side by side in compartments of the concrete structure of the barge and separated by vertical side walls of concrete, of structure and thickness not less than those of the concrete wall of said concrete bottom of the barge, and without any additional reinforcing structure.

Advantageously, the side walls of the tanks come against the surfaces of the side vertical walls of the compartments of the concrete structure of the barge in which said tanks are confined, so that the walls of two adjacent tanks which bear laterally against the same vertical intermediate wall between their compartments support each other mutually.

According to another characteristic of the present invention, the anchor points for the prestress cables of said prestressed concrete are situated outside said curved bottom wall of the concrete structure, and preferably outside the side vertical walls of concrete surrounding the tanks.

Preferably, the anchor points of the prestress cables are situated, in the cross-section plane of the barge, at the top ends of the side vertical walls of concrete surrounding the tanks. In this position they are easily accessible, and the prestress cables can be put under tension at the most optimum moment during building of the concrete barge, thus allowing manufacture of the insulation system and of the tank to start long before the concrete structure has been finished. The anchor points of the prestress cables parallel to the axis of the barge are situated in adjacent non-cryogenic storage zones that are reserved for consumables, fresh water, ballast, or indeed technical premises.

With giant barges, the thickness of the walls of the compartments in the concrete structure that confine said tanks, which thickness generally does not exceed 70 cm, makes it possible nevertheless to superpose sheets of metal reinforcement and sheaths for various prestress cables in such a manner that the cables used for prestressing the vault can be raised to the top portion of the concrete structure of the barge. By operating in this way, when building the concrete structure, it is possible very early on to release the cryogenic storage zone in which the tanks are to be installed, and in particular where the confinement membranes and the thermal insulation systems are to be installed, thus making it possible very significantly to reduce the overall time required for building the barge, since the insulation system which constitutes the element that is the most difficult and the most lengthy to install, can be begun at a much earlier stage during construction. The insulation system associated with its membrane must be assembled on site using individual prefabricated panels each measuring a few $m^2$ in general. The membrane made in this way is assembled by welding while it is directly in position, whereas in the prior art tanks have been prefabricated and installed using a minimum number of packages and thus of hoists, which requires free access and consequently implies that said tanks must be installed before the top portion of the barge can be built.

In an advantageous embodiment, said cylindrical tanks and the compartments of the concrete structure in which they are confined have a cross-section perpendicular to their main longitudinal axes, the top portions of said cross-sections comprising two sloping side cants corresponding to sloping plane walls of said compartments, said sloping walls resting on the top ends of vertical side walls of said compartments and connecting said side vertical walls to a top horizontal wall for each of said compartments.

In a preferred embodiment, the walls of said tanks are applied directly against the walls of said compartments inside which they are confined, i.e. the entire wall of each of said tanks follows the outline and matches continuously the shape of the inside surfaces of the corresponding walls of its compartment in the concrete structure of the barge.

Each of said compartments, and preferably each of said tanks thus comprises:

in its bottom portion: a cylindrical trough of section that is preferably semi-circular; and in its top portion:

two vertical side walls;

two sloping side walls; and a horizontal top wall.

This configuration makes it possible to reduce the sloshing of liquid gas in the tank when it is not completely full.

The anchor points of the transverse prestress cables are advantageously situated at the bottom ends of the sloping walls, still outside the tank compartments, with the longitudinal prestress cables being advantageously situated in the adjacent non-cryogenic tanks or storage zones.

Advantageously, the concrete structure has bilge keels along its sides.

Also advantageously, in its top portion, above the compartments containing said tanks, the concrete structure comprises a zone made up of rectangular caissons forming the main structure of the barge and providing the stiffness of the overall structure.

The top deck of the barge has sufficient strength to receive all of the liquefaction or regasification installations, together with the equipment for producing electricity, and the total mass thereof may exceed 50,000 tonnes.

In a preferred embodiment, the concrete walls of said compartments, preferably the intermediate side vertical walls between two tanks, include a heating system embedded in the concrete. This makes it possible to limit the extent to which the wall is cooled. Heat flows through the insulation system of the tank have the effect of cooling the concrete, and this cooling is limited only by supplying heat taken either from the bottom portion of the concrete hull of the barge which is in contact with sea water, or from the top portion which is in contact with ambient air, or else by adding additional heat directly within the mass of the concrete. It is imperative to limit the extent to which the concrete is cooled since below a certain temperature the steel reinforcement becomes fragile and the strength of the structure is reduced very significantly. Said reinforcement can be selected to withstand very low temperatures, however its cost then becomes very high, so it is preferable to limit exceptional temperature drops to values of the order of $-10°$ C. to $-20°$ C., with the usual temperature of the structure preferably lying around $0°$ C. to $+5°$ C.

Heat can be provided by incorporating electric heater cables in the concrete, or tubes carrying a hot fluid, or indeed by injecting electricity directly into the prestress cables, in particular those cables which need to be protected on a priority basis. Such additional heat can also be provided passively by mere conduction of heat along cables embedded in the concrete and in communication with the surrounding sea water.

In a preferred version of the invention, the heating system is a self-contained heating device using a thermodynamic cycle without any external heat energy being supplied thereto, the device comprising pipework embedded in the concrete and opening out into a tank having a large heat exchange area with the sea water at the bottom and on the outside beneath the concrete structure, said pipework and said tank for heat exchange with the water containing a refrigerant which circulates and transfers heat between a hot source constituted by the surrounding sea water and a cold source constituted by the mass of concrete to be heated.

The prestressed concrete barge for cryogenic liquefied gas of the invention is preferably intended for giant storage facilities having a capacity of more than 100,000 m³ of liquefied gas at temperatures below $-100°$ C., and possibly reaching or exceeding a total volume of 300,000 m³. Such a barge measures about 250 m to 300 m in length, 60 m to 70 m in width, and 25 m to 30 m in depth.

The barge of the invention may have a top deck suitable for receiving liquefaction or regasification installations, or equipment for producing electricity.

Other characteristics and advantages of the present invention appear in the light of the following detailed description given with reference to the accompanying figures.

BRIEF DESCRIPTION OF THE DRAWINGS

In the drawings:

FIG. 1 is a view of a vertical cross-section of a cryogenic storage concrete barge according to a preferred embodiment of the invention, wherein the plane upon which the vertical cross-section is taken is indicated by line I in FIG. 2;

FIG. 2 is a view of a horizontal cross-section of the barge in FIG. 1 showing the various cryogenic storage compartments, wherein the plane upon which the horizontal cross-section is taken is indicated by line II in FIG. 1;

FIG. 3 is a magnified view of a section of bottom wall $5_4$ in FIG. 1, showing a thin membrane tank applied thereagainst;

FIG. 4 is a magnified view of a section of vertical side wall $4_2$ between compartments containing the cryogenic tanks for liquefied gas in FIG. 1, wherein the vertical side $4_2$ wall is fitted with a combined electricity and hot water heater network; and FIG. 5 is a magnified view of a section of vertical side wall $4_2$ of FIG. 1, wherein the vertical side $4_2$ wall is part of a self-containing heating system making use of thermodynamic cycling.

DETAILED DESCRIPTION OF THE PRESENTLY PREFERRED EMBODIMENTS

The barge according to the presently preferred embodiment of the invention as shown in FIGS. 1 and 2 comprises a concrete structure 1 made of reinforced concrete with metal reinforcement and prestressed using cables. As shown, it comprises six cryogenic storage tanks 2 disposed in compartments 14. The walls of the tanks 2 are shown diagrammatically in FIG. 3 and are described below.

The barge of the invention shown in cross-section in FIG. 1 presents a profile that is constant all along the liquefied gas storage zone, with transverse bulkheads 19 in its partially submerged bottom portion defining, as shown in FIG. 2:

compartments 14 for containing the cryogenic tanks 2;

compartments 15, which can be similar in shape to the compartments 14 or of rectangular shape, for storing other fluids such as gas oil, fresh water, or any other substance such as condensates or butanes and propanes which can be stored either in free-standing refrigerated tanks or in tanks under pressure at ambient temperature; and ballast tanks 16 of any shape and filled with water.

The bottom portion of the barge, constituting its partially submerged concrete hull, contains compartments 14 for the liquefied gas tanks 2, with the bottom 3 of each compartment being in the form of a semicylindrical trough, so the hull constitutes three adjacent upside-down vaults. The walls of the tanks 2 are applied directly against the walls $4_1$, $4_2$, $5_1$, $5_2$, $5_3$, and $5_4$ of the concrete compartments 14. The walls of each compartment 14 thus comprise:

a bottom wall $5_4$ in the form of a circular-section semicylindrical trough;

vertical side walls which can be the sides $4_1$ of the barge or intermediate partitions $4_2$ between pairs of adjacent compartments; and plane top walls $5_1$, $5_2$, $5_3$ represented by cants in the section of FIG. 1 and comprising:

side top walls $5_1$ and $5_2$ sloping towards the vertical plane of symmetry of the compartment 14 and its tank 2; and a horizontal top wall $5_3$ interconnecting the top ends of the sloping side top walls $5_1$ and $5_2$.

The intermediate walls $4_2$ can be double walls for inspection purposes or to improve temperature control of the concrete webs. Similarly, the side walls $4_1$ of the barge can be double walls so as to provide mechanical protection against external shocks as can be caused, for example, by tenders or by vessels for transporting liquefied gas that are alongside the barge to load or unload said liquefied gas.

Anchor points 66 for the prestress cables 6 are situated at the bottoms of the sloping side top walls $5_1$, $5_2$ at the top ends of the vertical side walls $4_1$, $4_2$ of the compartments 14 and inside the compartments 26.

In the bottom portion of the barge and preferably in the sides of the barge, it is advantageous to install structural extensions that are optionally continuous along the length of the barge, and that act as bilge keels 21. The function of the bilge keels is to damp the roll of the barge, firstly by increasing the overall inertia of the system by adding a mass of water, and secondly by dissipating energy by creating turbulence towards the ends of said bilge keels. The amount of energy created by the turbulence can advantageously be increased by making holes in the bilge keels. Since the bilge keel technique is known to the person skilled in the art of ship building, it is not described in greater detail herein.

The bottom walls $5_4$ of the compartments 14 being in the shape of adjacent upside-down vaults makes it possible to further limit the draft required during launching, once the dry-dock has been completely filled, by injecting air beneath the hull. Said air is then trapped in the high points 20 that exist between two cylindrical tanks and the high points 22 that exist between a side cylindrical tank and the bilge keel 21. The additional buoyancy created in this way enables the barge to be taken to a location where the draft is sufficient to provide acceptable buoyancy after said injected air has been removed.

The top portion of the barge above the compartments 14 containing the cryogenic tanks 2 comprises a top deck 23 supported by elements in the form of second caissons 17 which are rectangular, having vertical walls 18 that constitute longitudinal reinforcement for the structure and that serve to support installations such as liquefaction equipment, regasification equipment, or indeed equipment for transferring or producing electricity, together with all of the equipment required for the logistics of the installations and the crew, all installed on the top deck 23 and having a total weight that can exceed 50,000 tonnes.

Triangular-section compartments 26 above the vertical side walls $4_2$ are defined by the sloping side walls $5_1$ and $5_2$ of two adjacent compartments 14 and by the bottom decks of said second caissons 17. These compartments 26 give access to the anchor points of the prestress cables and they can be used in part for storage purposes.

The barge shown in FIGS. 1 and 2 contains six tanks each having a capacity of 50,000 m³ and its total size is 250 m to 300 m long by 60 m to 70 m wide and 25 m to 30 m high. The thickness of the concrete wall is about 60 cm to 70 cm in its portion corresponding to the web supporting the cryogenic tanks. The other compartments have webs of various thicknesses possibly associated with reinforcing beams.

FIG. 3 is a diagram showing the configuration of wails for one type of thin membrane tank known to the person skilled in the art. The thin membrane 23 is preferably made of stainless steel in the form of sheeting that is 0.5 mm to 2 mm thick and that preferably presents corrugations for the purpose of absorbing the deformation due to the extreme variations in temperature. This membrane rests on an insulating complex made up of blocks of synthetic material, in particular polyurethane foam 24 between two plates of semi-rigid material 25 of the plywood type.

FIGS. 4 and 5 show various systems for heating the intermediate walls $4_2$ of the compartments 14 containing the cryogenic tanks 2 since these walls are never in direct contact with sea water and they tend to cool down because of their cryogenic environment.

The left of FIG. 4 shows a network of tubes 9 in which a heating fluid circulates, and the right of the figure shows a network of electric cables 8 disposed in a staggered configuration.

FIG. 5 shows a heating device that operates by means of a thermodynamic cycle, which device comprises vertical pipes 10 incorporated in the intermediate walls $4_2$ of the compartments 14, each pipe 10 having ramifications in the form of tubular extensions 13 extending within the intermediate wall $4_2$. The bottom of the pipe 10 is under water and communicates with a heat exchange tank 11 with fins 12 thus providing a large heat exchange area with the surrounding water.

The assembly comprising the pipe 10 and the tank 11 is disposed in such a manner as to have only one low point which is situated at the bottom of the tank. It is filled with a refrigerant fluid selected to liquefy at a temperature which corresponds to the minimum temperature desired in order to protect the web. Heat transfer then takes place as follows: a) the gas present in the pipework 10 condenses in the cold zones 130, thereby transferring heat to the concrete, and also establishing suction by reducing in volume; b) the condensate trickles down the pipework 10 under the effect of gravity and goes to the tank 11 because there are no low points along its path; c) the condensate in contact with the wall of said tank, itself in contact with the ambient water 12, is heated and vaporized; and d) the fluid re-vaporized in this way compensates for the loss of pressure and urges gas back into the cold zones to be heated. The type of refrigerant fluid is selected as a function of the minimum temperature of the surrounding water and also as a function of the protection temperature desired for the concrete web. By way of example, butane is suitable for acting as the refrigerant fluid and serves to transfer heat between the hot source (ambient water) and the cold source (concrete web). Numerous fluids have been developed in the refrigeration industry for optimally matching various hot source and cold source configurations. The device is self-adapting and operates continuously without any external energy being supplied other than by the surrounding water, which presents a considerable advantage over the heating technologies that use electricity or a hot fluid since in general such technologies involve the production of greenhouse gases such as $CO/CO_2$.

The capacity to transfer heat depends mainly on the heat exchange areas in the cold zone of the concrete web and on the heat exchange areas in the hot zone of surrounding water. To this end, the bundle of pipes embedded in the concrete advantageously has ramifications, and each of said ramifications must avoid having any low point so that the condensates always move down to the bottom tank under gravity only. Similarly, the heat exchange area with the surrounding water is increased either by using multiple fins or else by forced water circulation using propellers or pumps, e.g. in the vicinity of a heat exchanger.

This new design of barge is adapted to all types of cryogenic storage, and in particular to storing liquefied hydrocarbons such as methane, butane, and propane, and also storing any other gas such as hydrogen, nitrogen, oxygen, rare gases, or indeed gases produced by the chemicals industry such as ethylene or ammonia.

This new type of barge can be a floating support held floating on site by an anchor system, or it can be built and towed to its site prior to being ballasted so as to rest on a previously prepared bottom and remain fixed relative to the bottom throughout its working lifetime. When the barge is taken out of service, it then suffices to re-float it by injecting compressed air into the zones between the vaulted portions of the hull. The barge can then be towed for installation on another site.

What is claimed is:

1. A barge for storing liquefied gas comprising:
a floating structure of reinforced and prestressed concrete containing tanks for liquefied gas;
wherein each of said liquefied gas tanks has a substantial semi-cylindrical bottom portion for resting directly on a concrete bottom of the barge;
wherein the concrete bottom of the barge comprises:
a plurality of adjacent semi-cylindrical troughs, each semi-cylindrical trough receiving the semi-cylindrical bottom portion of one of the liquefied gas tanks.

2. The barge of claim 1, wherein at least one tank of the plural liquefied gas tanks is a tank of the type having a thin membrane which is covered on the outside by a thermally insulating complex, said complex resting directly against the concrete bottom of the barge, the concrete wall of said barge bottom being of substantially constant thickness and without any additional reinforcing structure over the entire tank-supporting zone.

3. The barge of claim 1, wherein at least two of the plural semi-cylindrical troughs are disposed longitudinally side by side in compartments of the concrete floating structure and are separated by vertical side walls of concrete, wherein said vertical side walls are of structure and thickness not less than those of the concrete wall of said concrete bottom of the barge, and without any additional reinforcing structure.

4. The barge of claim 1, wherein said plural liquefied gas tanks and the compartments of the concrete structure in which they are confined have top portions comprising two sloping side cants corresponding to sloping plane walls of said compartments, wherein said sloping plane walls rest on top ends of vertical side walls of said compartments and connect said vertical side walls to a top horizontal wall.

5. The barge of claim 1, wherein the walls of said plural liquefied gas tanks are applied directly against the walls of compartments inside which they are confined.

6. The barge of claim 1, wherein anchor points for prestress cables of said prestressed concrete are situated outside said plural adjacent semi-cylindrical troughs in the bottom of the concrete structure.

7. The barge of claim 6, wherein the anchor points of the prestress cables are situated at the top ends of side vertical walls of concrete surrounding the tanks.

8. The barge of claim 1, wherein the concrete walls of compartments in which the plural liquefied gas tanks are contained include a heating system embedded in the concrete.

9. The barge of claim 8, wherein the heating system is implemented by incorporating electric heating cables in the concrete, or by electrifying the prestress cables, or by tubes conveying a hot fluid, or by conducting heat along cables embedded in the concrete and in connection with the sea water.

10. The barge of claim 8, wherein the heating system is a self-contained heating device using a thermodynamic cycle without any external heat energy being supplied thereto, the self-contained heating device comprising pipework embedded in the concrete and opening out into a tank having a large heat exchange area with the sea water at the bottom and on the outside beneath the concrete floating structure, said pipework and said tank for heat exchange with the water containing a refrigerant which circulates and transfers heat between a hot source constituted by the surrounding sea water and a cold source constituted by the mass of concrete to be heated.

11. The barge of claim 1, wherein the barge stores more than 100,000 $m^3$ of liquefied gas at a temperature below −100° C.

12. The barge of claim 1, further comprising:
a top deck suitable for receiving liquefaction or regasification installations or equipment for producing electricity.

13. The barge of claim 1, wherein anchor points for prestress cables of said prestressed concrete are situated outside the side vertical walls of concrete surrounding the plural liquefied gas tanks.

14. The barge of claim 1, wherein the intermediate side vertical walls between liquefied gas tanks contain a heating system embedded in the concrete.

15. A barge for storing and transporting material in cryogenic tanks comprising:
a floating structure of reinforced and prestressed concrete comprising a plurality of adjacent concrete compartments, wherein each of said plural adjacent concrete compartments contains a cryogenic tank and comprises:
a semi-cylindrical trough extending longitudinally and forming a bottom of the concrete compartment, the interior of said semi-cylindrical trough being for receiving a bottom portion of the cryogenic tank, the exterior of said semi-cylindrical trough forming a bottom exterior surface of the floating structure; and
a common vertical side wall, which extends longitudinally to form a side wall of the compartment, and wherein said common vertical side wall is shared with an adjacent concrete compartment.

16. The barge of claim 15, wherein at least one of the cryogenic tanks comprises:
a thin membrane tank having a thin membrane, wherein a thermally insulating complex covers the outside of said thin membrane, wherein said thermally insulating complex rests directly on the interior of the semi-cylindrical trough of the compartment in which it is contained.

17. The barge of claim 15, wherein the concrete forming the common vertical side wall of a compartment has a structure and a thickness substantially similar to the concrete of the semi-cylindrical trough of a compartment.

18. The barge of claim 15, wherein anchor points for prestress cables of said prestressed concrete are situated outside of said semi-cylindrical trough in the bottom of the concrete structure.

19. The barge of claim 15, wherein the common vertical wall contains a heating system embedded in the concrete.

20. The barge of claim 15, further comprising:
a top deck suitable for receiving liquefaction or regasification installations or equipment for producing electricity.

* * * * *